H. L. BARRETT.
PUSHER FEED FOR GANG SAWS.
APPLICATION FILED JULY 14, 1919.

1,348,389.

Patented Aug. 3, 1920.
2 SHEETS—SHEET 1.

Inventor
Herbert L. Barrett

By Herbert E. Smith
Attorney

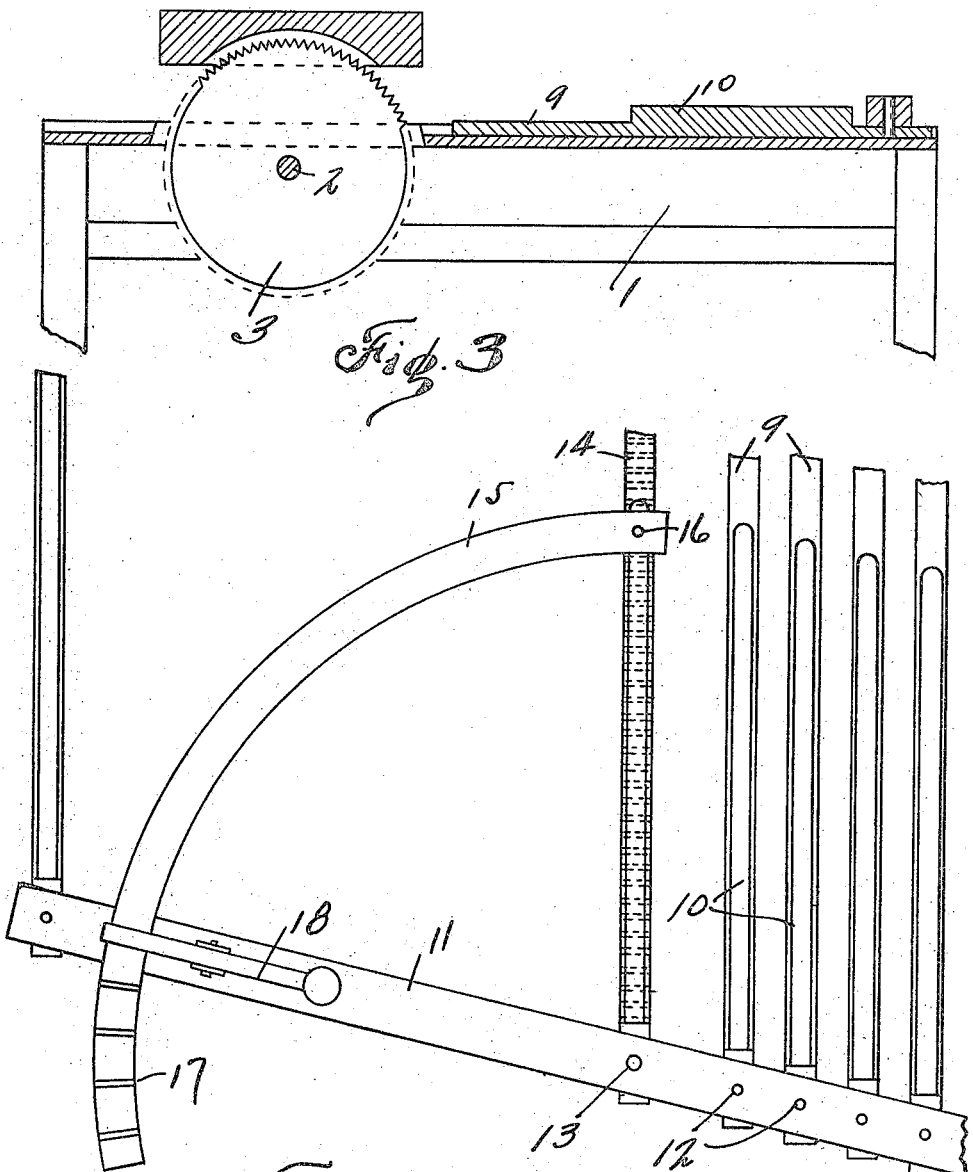

UNITED STATES PATENT OFFICE.

HERBERT L. BARRETT, OF OPPORTUNITY, WASHINGTON.

PUSHER-FEED FOR GANG-SAWS.

1,348,389.   Specification of Letters Patent.   Patented Aug. 3, 1920.

Application filed July 14, 1919. Serial No. 310,568.

*To all whom it may concern:*

Be it known that I, HERBERT L. BARRETT, a citizen of the United States, residing at Opportunity, in the county of Spokane and State of Washington, have invented certain new and useful Improvements in Pusher-Feeds for Gang-Saws, of which the following is a specification.

The present invention relates to an improved pusher feed for gang saws adapted especially for sawing match blocks.

In this class of work, and in analogous work, it is primarily essential that the wood be sawed at right angles to the grain, in order to secure the best results in match making, and to this end it is necessary to move the wood or lumber to present it properly to the saws, during the sawing operation.

When one saw only is being used, and one cut out of the timber is being made the sawyer is required to continuously move the timber as the sawing progresses in order to secure a square cut, or to present the grain of the material to the saw at the proper angle.

In the present invention a gang of saws is utilized, to simultaneously cut say ten match blocks, and a pusher feed device is provided by means of which the separate match blocks are cut and fed to the saw, each at the proper angle, by first adjusting the lumber with relation to the saws. Then as the sawing progresses the blocks are pushed between adjoining saws, to be properly disposed of after sawing, and the pusher feed is reversed and brought back to initial position.

The invention consists in certain novel combinations and arrangements of parts of the pusher feed mechanism, as will be hereinafter described and claimed in connection with the illustrations in the drawings.

The accompanying drawings illustrate one complete example of the physical embodiment of the invention, constructed and arranged according to the best mode so far devised for the practical application of the principles of the invention.

Fig. 3 is a transverse, vertical sectional view on line 3—3 of Fig. 2.

Fig. 4 is an enlarged detail view showing part of the pusher feed device.

Figure 1:
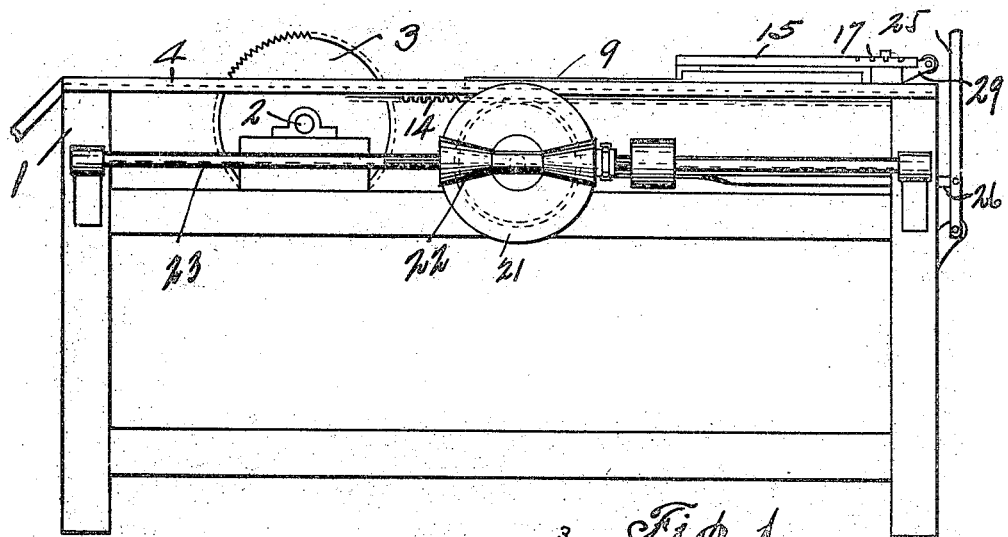
Figure 1 is a side elevation of a sawing machine embodying the present invention.

In the preferred form of the invention the usual main frame 1 of the sawing machine is disclosed, supporting the saw arbor 2, upon which the saws 3 are arranged as a gang and spaced the proper distance apart. The saws project upwardly through the slots provided therefor in the table 4, and they are rotated by their arbor 2 from the pulley 5, as usual.

The upper surface of the table 4 is fashioned with a series of parallel grooves 6, an end groove 7, and an intermediate slot 8, the grooves 6 numbering ten and arranged in line with the spaces between the eleven saws 3 of the gang, and all the grooves and the slot extending substantially the length of the table.

Within these grooves, and slidable therein are complementary arms or bars 9, movable longitudinally of the table and reciprocable in the grooves to advance and return to initial position, and the arms are fashioned with fingers 10. In Fig. 3 it will be seen that the arms project slightly above the table top for the work or material to rest on, and that the fingers 10 project above the top of the arms to form abutments for pushing the wood or lumber as it rests upon the arms. The arms form the carriage for the work, and as they reciprocate in their grooves they carry the work forward and it is sawed into blocks, and these blocks are pushed between the saws by the arms as they advance in the grooves, until the saws have passed through the lumber, severing it into blocks. Then the sawed blocks are disposed of as usual and the carriage returns to the front of the machine.

Figure 2:
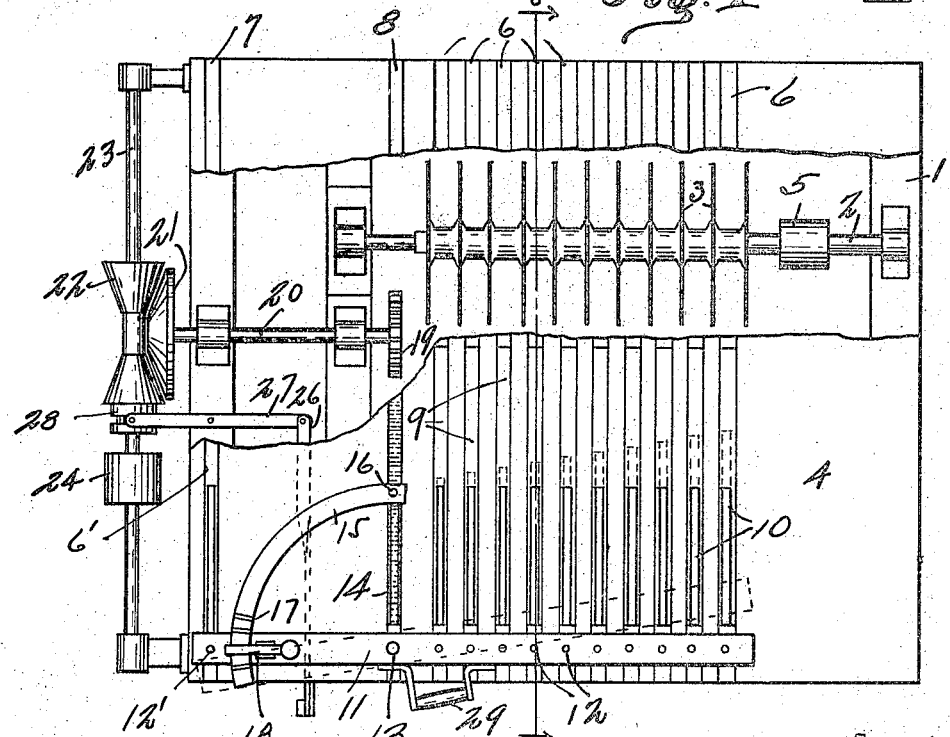
Fig. 2 is a top plan view showing the table top partly broken away to disclose the actuating pinion for the pusher feed device, with the feed device shown on top of the table.

Each arm of the plurality of arms is pivoted to the pusher bar 11, the pivots being indicated at 12, and the arms are thus angularly adjustable to the bar, while the bar itself is pivoted at 13 to the rack bar 14 which forms a fulcrum for the adjustment of the bar with relation to the rack bar and table. This adjustment of the push bar on its pivot 13 admits of positioning the pusher arms and fingers to retain and push a piece of work toward the saws at a desired angle in order to bring the grain of the wood squarely to the saws, as indicated in dotted lines Fig. 2. The pivots 12 of the arms 9, the pivot 12' of the guide arm 6' in the groove 7, and the pivot 13 are all arranged with a loose connection to permit swinging of the pusher bar on its fulcrum in well known manner. The adjusted relationship of the pusher arms and pusher bar is maintained by the utilization of a curved bracket 15 pivoted to the rack bar 14 at 16, and at its free end formed as a ratchet 17 to be engaged by the pawl 18 pivoted on the pusher bar.

The rack bar, with its teeth on its lower surface co-acts with the pinion 19 located beneath the table and carried by the shaft 20, which latter is suitably journaled and provided with a friction disk 21, at the side of the machine, which is a driven disk or wheel operated through the double friction drive gearing 22 on the main shaft 23. The shaft is driven by a belt on the pulley 24, and it will readily be seen that the movement of the shaft may be reversed by manipulation of the clutch lever 25 connected by the link 26 to the shift lever 27, and this lever is operatively connected to the gearing by the spool 28 on the shaft 23. A handle 29 is provided on the pusher bar by means of which it may be moved in adjusting the pusher arms.

The reciprocations of the carriage are controlled by the sawyer or operator through manipulation of the lever 25, and it will be apparent that the friction gearing, as it is reversed, will have a flexibility of movement enabling the parts to be stopped and started without undue jar or strain, and the sawyer, standing at the front of the machine has complete control thereof through the handle 29, the lever 25 and the dog or pawl 18.

Thus the machine is enhanced as regards the speed with which it is enabled to saw the wood, and the simplicity of construction and operation of the feeding device render it facile in its performance of the functions required of it.

Claims—

1. The combination in a gang saw machine with the grooved table, of a plurality of pusher feed arms forming a carriage, and an adjustable pusher bar bodily movable with the carriage and pivoted to swing in the plane of the table-top, pivotal connections between each feed arm and said bar, and means for reciprocating said carriage.

2. The combination in a gang saw machine with a grooved table, of a series of independent pusher feed arms slidable in the grooved table and forming a carriage, a rack bar movable with the carriage, a pusher bar pivoted to swing on said rack bar in the plane of the table-top and having pivotal connection with each arm, and means for retaining the pusher bar and rack bar in adjusted position, substantially as described.

3. The combination in a gang saw machine with a grooved table, of a series of independent pusher feed arms slidable in the grooved table and forming a carriage, a rack bar movable with the carriage, a pusher bar pivoted to swing in the plane of the table on said rack bar and pivotally connected to each arm, a ratchet bracket on the rack bar and a pawl on the pusher bar to engage the ratchet bar, and reversible means for reciprocating the carriage, as described.

In testimony whereof I affix my signature.

HERBERT L. BARRETT.